United States Patent [19]

Welti

[11] 4,404,532
[45] Sep. 13, 1983

[54] MODULATOR HAVING IMPROVED BANDWIDTH AND POWER REQUIREMENTS

[75] Inventor: George R. Welti, Leesburg, Va.

[73] Assignee: Communications Satellite Corporation, Washington, D.C.

[21] Appl. No.: 362,326

[22] Filed: Mar. 26, 1982

Related U.S. Application Data

[63] Continuation of Ser. No. 947,313, Sep. 29, 1978, abandoned.

[51] Int. Cl.³ .......................... H03C 5/00; H03D 3/18; H04J 9/00
[52] U.S. Cl. ...................................... 332/17; 332/21; 332/23 R; 329/50; 329/110; 329/124; 329/135; 375/42; 375/67; 375/86; 370/11
[58] Field of Search .................. 329/50, 110, 112, 124, 329/132, 135, 136; 332/16 R, 17, 21, 23 A, 23 R; 455/102, 255–260, 263–265; 375/42, 53, 67, 80–81, 83, 85–87, 94; 370/11

[56] References Cited

U.S. PATENT DOCUMENTS

| | | | |
|---|---|---|---|
| 2,611,826 | 9/1952 | Kalfaian | 370/11 |
| 3,160,812 | 12/1964 | Scantlin | 370/11 X |
| 3,805,191 | 4/1974 | Kawai et al. | 332/21 X |
| 3,970,946 | 7/1976 | Matsuo | 329/132 X |
| 3,988,539 | 10/1976 | Motley et al. | 375/42 |
| 4,166,923 | 9/1979 | Kobayashi et al. | 332/17 X |

Primary Examiner—Siegfried H. Grimm
Assistant Examiner—Edward P. Westin
Attorney, Agent, or Firm—Sughrue, Mion, Zinn, Macpeak and Seas

[57] ABSTRACT

A modulator is disclosed for use with digitized multiplexed voice channels in which service bits are transmitted using QPSK modulation while the audio information is transmitted using amplitude and phase modulation. The audio information in each channel is digitized and compressed using a mapping technique in which zero crossings of the audio signal are represented by binary O. The digitized channels are then multiplexed and coupled to the address inputs of a read-only memory. In the memory are stored digital numbers which represent in quadrature the amplitude and phase of the pulse to be transmitted corresponding to the digital data sample or service word then being presented at the address inputs of the memory. The digital numbers for the control words represent a constant amplitude while those corresponding to the data words represent an amplitude dependent upon the level of the original audio signal. No output carrier is produced for zero-value audio signals. A greater number of audio channels may be multiplexed within a given bandwidth than with previous systems while greatly reducing the required transmitter power.

31 Claims, 15 Drawing Figures

FIRST PULSE

SECOND PULSE

FIG 11

| 10 | 00 |
|---|---|
| 11 | 01 |

FIG 12

| 1010 1001 | 0010 0001 | 0111 <br> A• |
|---|---|---|
| •B <br> 1100 1011 | 0000 1111 | 0100 0011 |
| 1000 | 1110 1101 | 0110 0101 |

FIG 13

| 10101 | 11100 | 00010 | 01001 | 01111 |
|---|---|---|---|---|
| 10100 | 11011 | 00001 | 01000 | 01110 |
| 10011 | 11010 | 00000 | 00111 | 01101 |
| 10010 | 11001 | 11111 | 00110 | 01100 |
| 10001 | 11000 | 11110 | 00101 | 01011 |
| 10000 | 10111 | 11101 | 00100 | 01010 |
|  | 10110 |  | 00011 |  |

MODULATOR HAVING IMPROVED BANDWIDTH AND POWER REQUIREMENTS

This is a continuation of application Ser. No. 947,513, filed Sept. 29, 1978, now abandoned.

BACKGROUND OF THE INVENTION

1. Field of the Invention

The invention pertains to modulators for use in transmitting digitized multiplexed audio channels particularly for use in a microwave or satellite communication system. The invention further relates to a receiver and demodulator for receiving such multiplexed signals having reduced bandwidth and power requirements.

2. Description of the Prior Art

Microwave transmission systems and satellite relay systems have been finding increasing use in long-range communications. All types of data may be sent and received using these systems. Most frequently, the information to be transmitted is an audio or video signal which has been sampled and digitized prior to transmission.

For each channel of information to be transmitted, be it audio or video, a stream of digital words representing samples of the analog signal is produced which is usually in the form of a sequence of digital words, each of which includes a number of parallel or simultaneously presented binary bits. Eight bits per word or sample is the most common arrangement although other numbers have been used as well.

Within the stream of digital words for each channel, some of the words are service in addition to the data words which make up the majority of the total words to be transmitted. In the systems of the prior art, both the service words and the data words were transmitted using the same modulation technique. The well-known four-phase shift keying modulation technique (QPSK) was the most commonly employed modulation method. Amplitude modulation has also been employed.

With the QPSK technique, an output transmitted pulse is produced for each service or data word in the incoming data stream with the amplitude of the pulses constant independent of whether the word to which the pulse corresponded was a service word and whether or not any actual information was then present in the original data analog signal. Thus, even if there was absolutely no signal present on an incoming line, such as the silent periods which occupy up to 60% of an ordinary telephone conversation, the transmitted carrier was on at full power although no information was actually being conveyed by the output transmitted signal.

A number of different modulation techniques have been proposed for reducing the wasted transmitter power during times when no signal information is present in the corresponding analog input channel although none of these has met with wide acceptance. One reason that the newly proposed techniques have not met with wide acceptance would appear to be the fact that none recognizes that the service words must be transmitted with a lower bit error rate than may be tolerated for the data words which they accompany. By using only a single modulation technique for both service and data words, it has heretofore not been possible to minimize the transmitter power requirements while maintaining the necessary minimum levels of bit error rate for both service and data words.

In a still further attempt to conserve transmitter power, a known prior art system employed complicated techniques for speech compression and multiplexing so that no pulse signals were transmitted representing a silent voice channel within a multi-channel multiplexed system. Although this system did result in some savings of power and bandwidth, complicated and expensive voice detectors, the provision of unique identification words, and additional detectors and synchronizers were required.

SUMMARY OF THE INVENTION

Accordingly, it is an object of the present invention to provide a modulator which makes maximum use of both transmitter power and available bandwidth in consonance with the bit error requirements for both service and digital data words.

It is also an object of the present invention to provide such a modulator which is both inexpensive and simple to implement.

Still further, it is an object of the invention to provide such a modulator which can transmit a maximum number of voice or video channels within a fixed predetermined bandwidth.

As a complement to these objects, it is a still further object of the invention to provide a demodulator for use in a receiver for signals transmitted using a modulator constructed in accordance with the invention.

These, as well as many other objects of the invention, may be met by providing the combination of means for modulating a carrier signal during first time intervals using a first modulation type or technique with the carrier signal being continuously produced during these first time intervals, and means for modulating the carrier signal during second time intervals distinct from the first time intervals with a second modulation type. With the second modulation type, the carrier signal is substantially extinguished during the second time intervals when the corresponding input analog signal with which the carrier is modulated is of substantially zero amplitude. The system may be used as well for input digital data when the source of the input digital signals is silent. The first time intervals and the corresponding first modulation type are used for service words while the second time intervals and second modulation type are employed with data signals or words. The first modulation type is preferably a phase shift keying type of modulation while the second modulation type is an amplitude and phase modulation. Once the carrier signal has been modulated, it may be transmitted or translated to another frequency band and transmitted as required.

Objects of the invention may also be met by providing apparatus for modulating a carrier signal in accordance with input digital words in which some of the words are service words and other of the words are data words, the apparatus including means for determining whether an input digital word is a control word or a data word and means for producing a modulated carrier signal in response to the determining means. The modulated signal is of constant amplitude for the service words while the amplitude for data words is dependent upon the actual amplitude or numeric value of the words. For the data words, the amplitude of the carrier signal produced is substantially zero when the amplitude of the corresponding input analog signal is substantially zero. For service words, the carrier signal is modulated with phase shift keying while for data words amplitude and phase modulation is employed. Transmitting means may again be provided as desired.

The invention may also be practiced by a modulator for producing a modulated carrier signal in response to an input stream of digital words, some of which are service words and some of which are data words, which includes the combination of means for producing a control signal which indicates whether an input digital word is a service word or a data word, a memory which is addressed by words of the input stream of digital words and the digital control signal, with the memory storing first and second digital numbers for each input address which are taken together representative of an amplitude and phase property for each value of an addressing digital word, first and second digital-to-analog converters, the inputs of which are coupled to the data outputs of the memory, with the first digital-to-analog converter being coupled to receive the first digital numbers and the second digital-to-analog converter being coupled to receive the second digital numbers, first and second filter means coupled respectively to the outputs of the first and second digital-to-analog converters, first and second analog signal multipliers coupled respectively to the outputs of the first and second filter means, a carrier signal source having two outputs in phase quadrature with one another, with one of the outputs being coupled to a second input of the first analog signal multiplier and the other one of which is coupled to a second input of the second analog signal multiplier, and means for summing the outputs of the first and second analog signal mutlipliers to produce thereby the modulated carrier signal. For each service word which addresses the memory, the corresponding digital numbers represent, taken together in quadrature, a constant amplitude with phase dependent upon the digital value of the data word. In a preferred embodiment, means is provided for multiplexing a plurality of data streams to form a single interleaved stream at the input of the modulator circuitry. The two numbers stored in the memory for each addressing word are preferably in X, Y form, representing real and imaginary components of the modulated carrier signal. In the preferred embodiment, each data word is divided into two segments, each of which separately addresses the memory. The first of the segments includes a first sequence of digits including the most significant digit of the data word, and the second of the segments including a second sequence of digits including the least significant digit of the word. As used here, the term "digit" implies a single-place number of any desired radix. In the most usual construction, a radix of two is used so that a digit is a binary bit. To minimize the impact of transmission noise, the first segment should contain fewer digits than the second segment.

The invention may further be practiced by a method for modulating a carrier signal in accordance with an input stream of digital words, some of which are service words and some of which are data words, the method including the steps of modulating the carrier signal with phase shift keying modulation in response to input service words and modulating the carrier signal with amplitude and phase modulation in response to input data words. The amplitude of the modulated carrier signal is substantially zero for input data words corresponding to a sample of an analog signal of substantially zero amplitude. The step of modulating the carrier signal with amplitude and phase modulation includes dividing the data words into a plurality of segments and modulating the carrier signals separately in accordance with each segment.

The invention also encompasses apparatus for demodulating a received signal which had been modulated by a modulator of the invention and which thereby contains phase modulating components representing service words and amplitude and phase modulation components representing data words, the apparatus including the combination of means for dividing the received signal into quadrature analog components, means for producing digital samples of the quadrature components at predetermined time intervals, and a memory is addressed by the digital samples of the quadrature components with the memory storing digital numbers representing digital decision outputs for the service words and data words. Each of the data words may have at least two segments with the memory storing separate digital numbers for each of the two segments. The first one of the segments may comprise a sequence of digits including the most significant digit, and the second segment comprises the first sequence of digits including the least significant digit of the decision output for each binary word. The second sequence preferably has more digits than the first sequence to minimize the effect of transmission errors. One digit may be common to both sequences. The memory means may further store digital numbers representing errors in the digitized samples in both magnitude and phase. Further, there may be provided means for correcting received signals in response to the digital numbers representing the errors. Also, there may be provided first and second filters positioned between the means for dividing the received signal into quadrature components and the digital sample producing means. Each one of the filters is preferably Nyquist-matched for the received signals.

BRIEF DESCRIPTION OF THE DRAWINGS

FIG. 11 is a decision map for demodulated service pulses.

FIG. 12 is a decision map for demodulated first data pulses.

FIG. 13 is a decision map for demodulated second data pulses.

DESCRIPTION OF THE PREFERRED EMBODIMENTS

Figure 1:
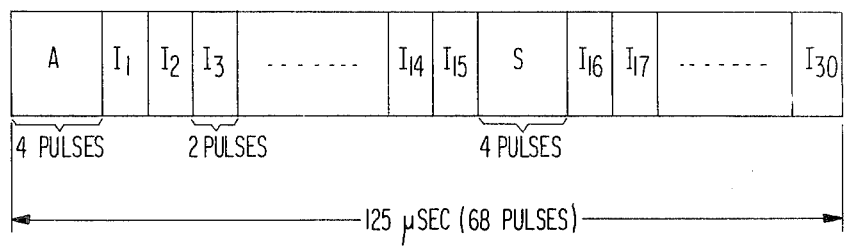
FIG. 1 illustrates an input and output data format used with a modulator of the invention.

Referring first to FIG. 1, there is shown a diagram of an input data frame format at would be used with a modulator of the invention. This is similar to a typical frame format which would be communicated to a terrestrial station over a microwave link destined for transmission from the terrestrial station to the satelite and back down to a receiving terrestrial station at a remote location. The format shown here is for 30 voice channels and occupies a total time of 125 microseconds. The particular times and channels for the format shown are by way of illustration only. Other formats, numbers of channels and time periods may be used as the situation requires.

At the beginning of the word, there are transmitted four pulses which are used for alignment of the data frame or for issuing an alarm command. Following the alignment or alarm pulses, there follows a sequence of 15 data words designated $I_1-I_{15}$. As will be described below, each data word is transmitted using two pulses. Each of these data words represents a sample from a voice channel which is preferably made up of eight ordered parallel binary bits. The eight bits of each data word are transmitted using two pulses and two pulse time periods. Following the first 15 data words, there four pulses of signaling information follow. The signaling information is used for establishing circuit routing and related operations. Another 15 data words follow the signaling time interval which are again samples from 15 different voice channels. As used herein, the term "data word" will refer to the information present in one of the data intervals $I_1-I_{30}$ while "service word" refers to the information present and transmitted during one of the alignment or signaling time intervals (four pulses).

The only actual difference between the format shown in FIG. 1 and that communicated via a typical microwave link is the relative times assigned to the service and data words. Twice as much time is allocated in the format of FIG. 1 to the service words than in the typical microwave data link (such as that specified in the G.732 format recommended by the Fifth Plenary Assembly of the International Telecommunication Union in Geneva in 1973).

Figure 2:
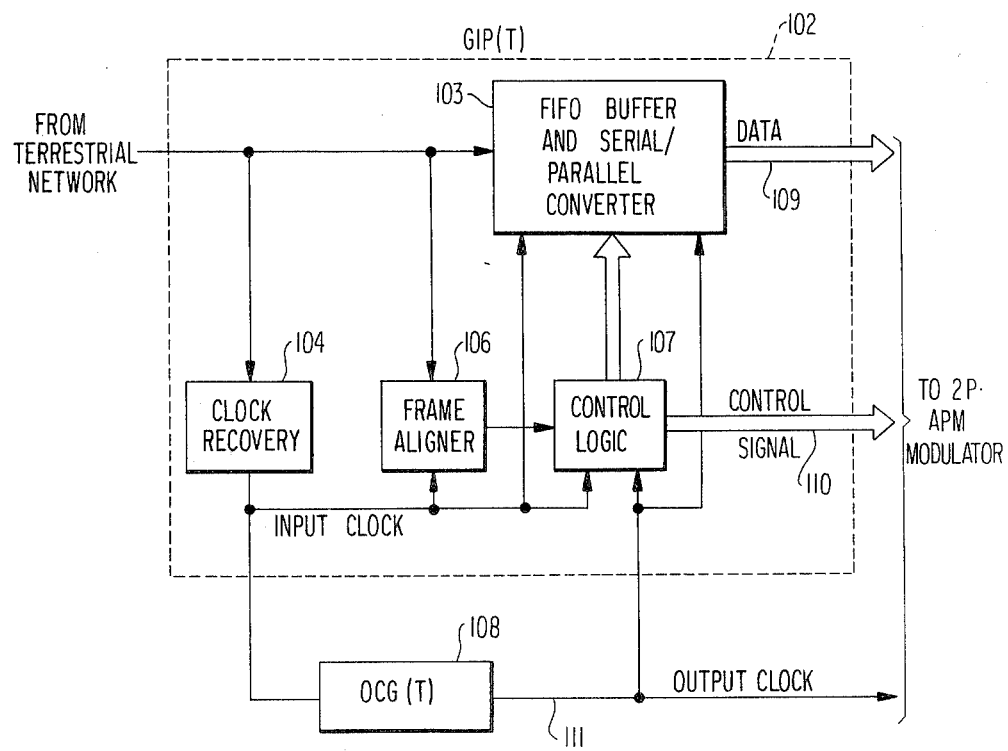
FIG. 2 is a block diagram of a group interface processor used with the modulator of the invention.

Referring next to FIG. 2, there is shown a block diagram of a group interface processor 102 which receives data such as from a microwave link and reformats or reconstitutes the data contained therein prior to modulation. Clock recovery circuit 104 produces an input clock signal sychronous with the input flow of data. Many well-known techniques are available for performing this function. Output clock generator (transmit) 108 divides a typical 2048 kilobaud input clock down to a preferred output rate of 544 kilobaud.

Frame alignment circuit 106 produces an output pulse which marks the beginning of each frame of data. Many well-known constructions are available for such a circuit, and the details thereof thus need not be discussed here. The input data is read into first in/first out buffer and serial/parallel converter 103 at the input clock rate. The control logic 107 controls the format of the data log output of the FIFO buffer.

The audio signal in each channel may be speech compressed according to the well-known A-law technique or any one of a number of familiar speech compression techniques. In many of these techniques, the zero crossings of the analog audio signal are represented by non-zero digital numbers. If this is true of the incoming digital data from the terrestrial link, the signals should be converted to a form in which the zero crossing is represented by a zero digital value. Either a sign and magnitude or a complement form may be used.

Twenty-four bits of data are stored at any one time within first in/first out buffer and serial/parallel converter 103. This represents, for example, three data words as read in from the microwave link. In consonance with the requirements of the modulator of the invention, the data and service words are read out from first in/first out buffer and serial/parallel converter 103 with a different number of parallel bits than that at which they were read in, with the number of bits dependent upon whether the data being read out is a service word or a data word. For the service words, two bits at a time are read out. For data words, for reasons which will become clear from the explanation below, the data words are divided out into overlapping segments. The first segment includes a sequence of digits or bits starting from the most significant digit and preferably including the four most significant digits bits 1 to 4. The second segment includes the five least significant digits bits 4 to 8.

Control logic 107 produces a two-bit control signal on output bus 110 which identifies the type of word presented on data and service word bus 109 (labeled for convenience simply as "data bus 109") at the output of first in/first out buffer and serial/parallel converter 103. One of the two-bit codes on control signal bus 110 represents control words, one the first segment of a data word, and the third the second segment of the data words. The two-bit control signal is produced by a simple counting operation commencing from receipt of the frame alignment pulse from frame alignment circuit 106.

Thus, control logic 107 may constitute a simple 7-bit binary counter for the word length of the example given here which is capable of counting to 68 and then being reset. For example, two Texas Instruments, Inc. type SN 74190 integrated circuits connected in accordance with the manufacturer's instructions will perform this function. First in/first out buffer and serial/parallel converter 103 can be constructed, for example, using a Texas Instruments, Inc. type SN 74164 serial to parallel converter coupled at its outputs to two type SN 74170 register files, one for data words and one for service words.

Figure 3:
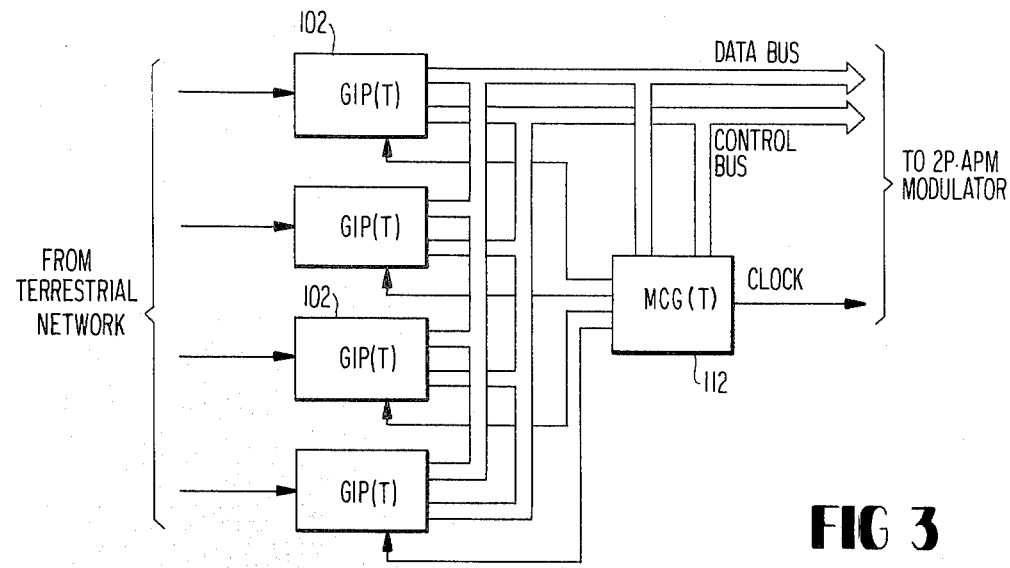
FIG. 3 is a block diagram of a multi-group processor which may be used with one embodiment of the invention.

In the event that plural microwave links are feeding information to the modulation system, a number of the group interface processors 102 as shown in FIG. 2 may be interconnected as shown in FIG. 3 for multiplexing of the various input data streams. Here, the construction of each group interface processor 102 is the same as that shown in FIG. 2, but a separate master clock generator (transmit) 112 is provided so that a single constant period clock signal can be produced.

Figure 4:
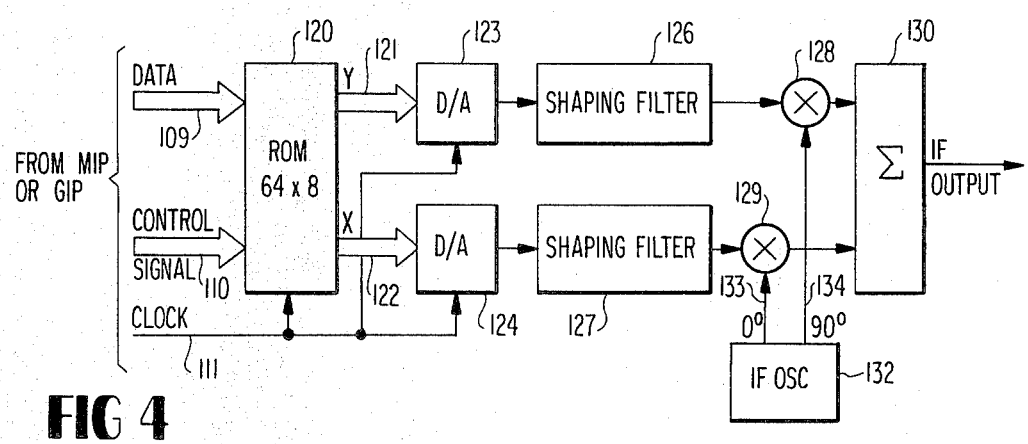
FIG. 4 is a block diagram of a modulator of the invention.

FIG. 4 shows in block diagram and schematic form a modulator circuit constructed in accordance with the teachings of the present invention. The data and control words upon bus 109 and the two-bit control signal on line 110 are coupled to the address inputs of read-only memory 120. New inputs on buses 109 and 110 are presented with each clock pulse signal on line 111.

Figure 5:
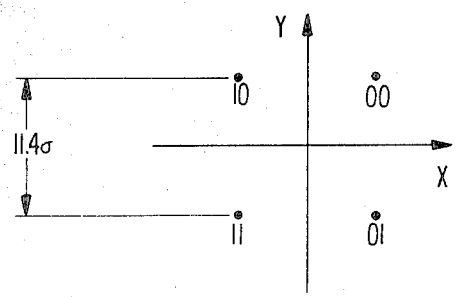
FIG. 5 is a complex plane diagram showing the encoding of service digits.

The data stored in read-only memory 120 will first be described in conjunction with the service words. With reference to FIG. 5, each value (00, 01, 11 and 10) for the input service words are mapped on an XY plane which represents a complex-plane mapping. An eight-bit number is stored for both X and Y for each of the four service word states and positions shown in FIG. 5 representing the real and imaginary parts of the output number. The two X and Y values read out from read-only memory 120 each time a service word is present upon bus 109 as indicated by control signal 110 and a clock pulse is received.

Read-only memory 120 may be implemented with a Texas Instruments, Inc. type SN 74188 read-only memory integrated circuit.

Figure 6:
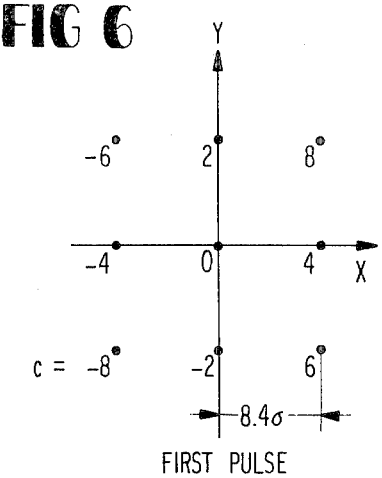
FIG. 6 is a complex plane diagram showing the encoding of the first pulse of the data words.
Figure 7:
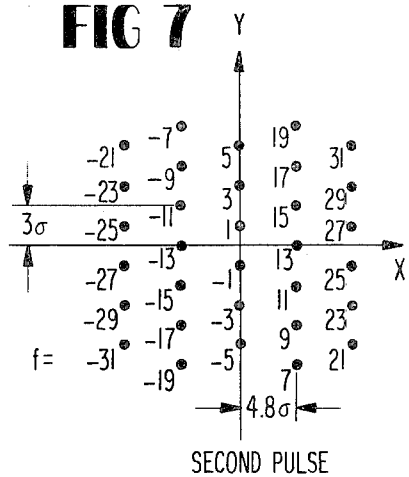
FIG. 7 is a complex plane diagram showing the encoding of the second pulse of the data words.

The digit mapping for the data words is shown in FIGS. 6 and 7, with FIG. 6 showing the mapping for the first segment and FIG. 7 showing the mapping for the second segment of the words. For the first segments, the four sequential most significant digits or bits are mapped into the nine positions shown in FIG. 6. As in the case of service words, an eight-bit digital number for each of X and Y is stored in read-only memory 120 for each of the positions shown in FIG. 6. For a zero input level corresponding to a zero or silent analog voice line, a zero digital number is stored. As may readily be appreciated from FIG. 6, the vectors drawn from the origin to any of the remaining eight positions have an amplitude which is dependent upon the map position and hence value of the digital word.

The mapping for the five bits of the second segments is shown in FIG. 7. Here, 32 different positions are indicated at symmetric positions around the X and Y axes. As in each of the previously described cases, an eight-bit digital number for each of X and Y is stored in read-only memory 120 for each of these positions.

Referring back to FIG. 4, the eight-bit X and Y outputs from read-only memory 120 are simultaneously coupled to digital-to-analog converters 123 and 124 where they are each converted to analog voltages at time periods marked by the clock pulses on line 111. The analog signals produced at the outputs of digital-to-analog converters 123 and 124 are passed through shaping filters 126 and 127, respectively. Shaping filters 126 and 127 are identical low-pass filters which are matched with the corresponding filters in the demodulator circuit to meet the Nyquist criterion. That is, the zero crossings of the output pulse signals from the demodulator filters are in synchronism with the clock rate.

The output signals from shaping filters 126 and 127 modulate the carrier signal produced by IF oscillator 132 with signal multipliers 128 and 129. The carrier signal coupled to multiplier 128 from IF oscillator 132 is 90° out of phase with that coupled to multiplier 129. The outputs of multipliers 128 and 129 are algebraically summed by signal summer 131. The IF output signal thus produced has an amplitude and phase determined by the digital value of the X and Y outputs from read-only memory 120. The modulated IF carrier signal from the output of signal summer 131 may then be translated to another frequency band as desired and amplified for transmission by using quite well-known techniques.

With the described modulation technique, when there is no information present to be transmitted from an input analog channel, there is no significant transmitter output signal produced. Moreover, unlike the system of the prior art, the amplitude of the transmitted signal, and hence the total power consumed, is dependent upon the actual amplitude of the input analog signal. A large savings in power is thus obtained while maintaining an acceptably low bit error rate without requiring expensive and complex equipment.

Figure 8:
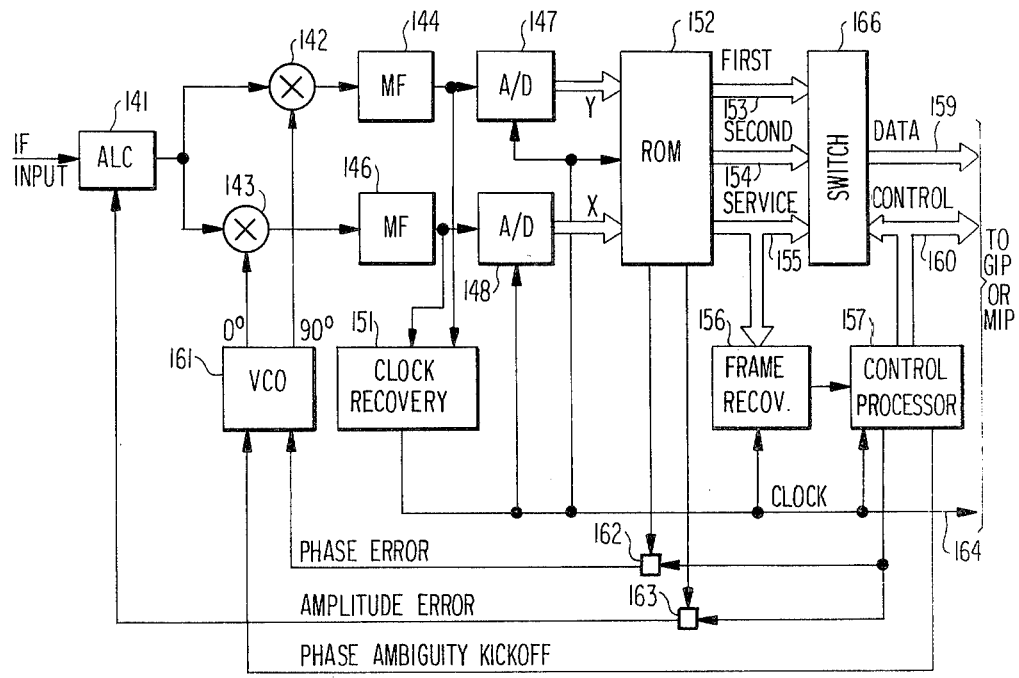
FIG. 8 is a block diagram of a demodulator of the invention.

A demodulator for use with a receiver adapted for use with signals produced by the modulator of the invention is shown in FIG. 8. The IF input signal from the "front end" of the receiver is coupled into the demodulator at the signal input of automatic level control circuit 141 where its amplitude is adjusted in accordance with an amplitude error signal. The output of automatic level control circuit 141 is coupled to an input of each of signal multipliers 142 and 143. The in-phase output signal from voltage controlled oscillator 161 is coupled to the second input of signal multiplier 143 and the quadrature signal to the second input of signal multiplier 142. The outputs of the multipliers are coupled respectively to matched filters 144 and 146 which are constructed as described above.

Clock recovery circuit 151 produces a clock signal on line 164, with one clock pulse being generated for each input pulse. Clock recovery circuits such as may be used here are generally well known. The outputs of matched filters 144 and 146 are also coupled to the signal inputs of analog-to-digital converters 147 and 148 which sample the filter outputs and produce a digital representation thereof at each clock pulse time.

If there were no interference or distortion in the transmission path, the outputs of analog-to-digital converters 147 and 148 would be identical to the X and Y digital signals emerging from the output of read-only memory 120 of the modulator circuit. These signals form the address inputs to read-only memory 152. When the address inputs are applied, values read out of read-only memory 152 for each clock pulse generated.

The contents of read-only memory 152 are specified in the decision maps shown in FIGS. 11, 12 and 13. FIG. 11 relates to the service words, FIG. 12 to the first segment of the data words, and FIG. 13 to the second segment of the data words. For the service words, if the vector defined by the X and Y inputs to read-only memory 152 falls within the first quadrant as shown in FIG. 11, a digital output of 00 will be present on the control output of read-only memory 152. The outputs for the other three quadrants are similarly specified. Read-only memory 152 may for example be a Texas Instruments type SN 74188 read-only memory integrated circuit.

For the first segment of the data words as shown in FIG. 12, the situation is somewhat more complex. If the X and Y digital numbers correspond to the point in the diagram marked "A", an unambiguous output on first data bus 153 from read-only memory 152 of 0111 will be produced. If, however, the vector corresponds to point "B", output values of both 1100 and 1011 are produced. The "correct" one of these two values is selected in accordance with the first bit of the second segment. That is, the last bit of the four-bit sequences shown in the boxes of FIG. 12 containing two different digital numbers must correspond with the first bit of the digital number selected for the second segment of the digital word. For example, if the first bit of the second segment is found to be 0, the value 1100 will be read out, while if the first bit of the second segment is 1, the value of 1011 will be read out.

To select between the two values, data selector switch 166 is provided. Both values for an output segment with two values are presented on the outputs of read-only memory 152 and stored within switch 166 until the second segment has been read out of read-only memory 152 on bus 154. Switch 166 then selects between the two values dependent upon the value of the first bit of the second segment. The value stored in read-only memory 152 for the various possible X and Y values for the second segments are shown in FIG. 13. Switch 166 may, for example, be constructed from a Texas Instruments, Inc. SN 74100 latch with its data outputs coupled to the data inputs of a type SN 74153 multiplexer.

Frame recovery circuit 156 detects the presence of control words on bus 155 and produces an output signal marking the beginning of each received frame. Control processor 157, including a counter reset by the output pulse from frame recovery circuit 156 and simple decoding circuitry, produces signals for operating switch 166 which indicates whether a first segment of the data word, a second segment of the data word or a service word is then present as the output of read-only memory 152. These same signals are presented along with the demodulated control and data words on bus 159 to the receiver group interface processor or the receiver multi-group interface processor, to be described, as the case may be for the particular configuration chosen.

Figure 14:
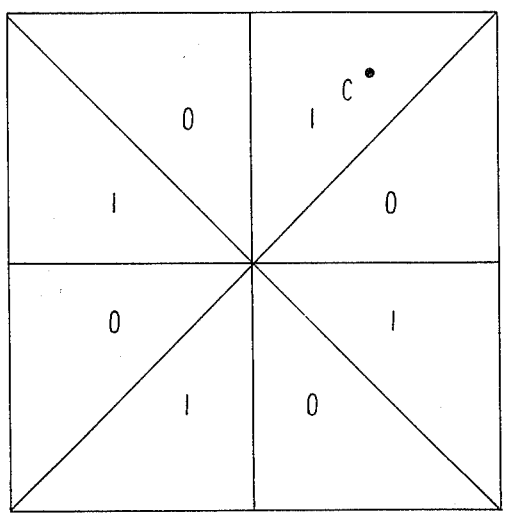
FIG. 14 is a decision map for phase errors in the service pulses in the demodulator.
Figure 15:
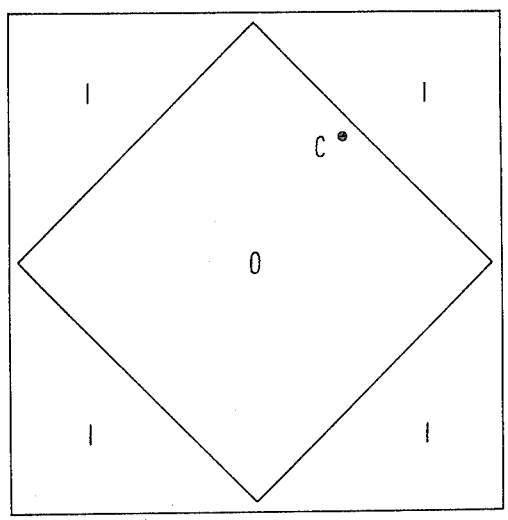
FIG. 15 is a decision map for amplitude errors in the service pulses in the demodulator.

Also stored within read-only memory 152 are bits representing the phase and amplitude errors for the X and Y digital numbers produced at the outputs of analog-to-digital converters 147 and 148. The decision maps for these error signals are shown in the views of FIGS. 14 and 15. Single-bit outputs are produced for each control word received. For the phase errors, if the vector specified by the X and Y digital numbers falls at point C as shown in FIG. 14, a phase error output of 1 is produced. For the decision map of FIG. 15 for amplitude errors, point C falls within the area for which a zero error signal is generated.

The single-bit phase and amplitude error signals are coupled respectively to one input of each of AND gates 162 and 163. The other input of each of AND 162 and 163 are fed with an enabling signal produced by processor 157 which is in the logical 1 state each time a control word is received. The resulting gated phase error signal is coupled to a correcting input of voltage controlled oscillator 161 while the resulting amplitude error signal is coupled to the correction input of automatic level control circuit 141. Both of these circuits include a low-pass filter on their inputs so that the bit streams produced at the outputs of AND gates 162 and 163 are averaged to produce an accurate correcting signals.

Figure 9:
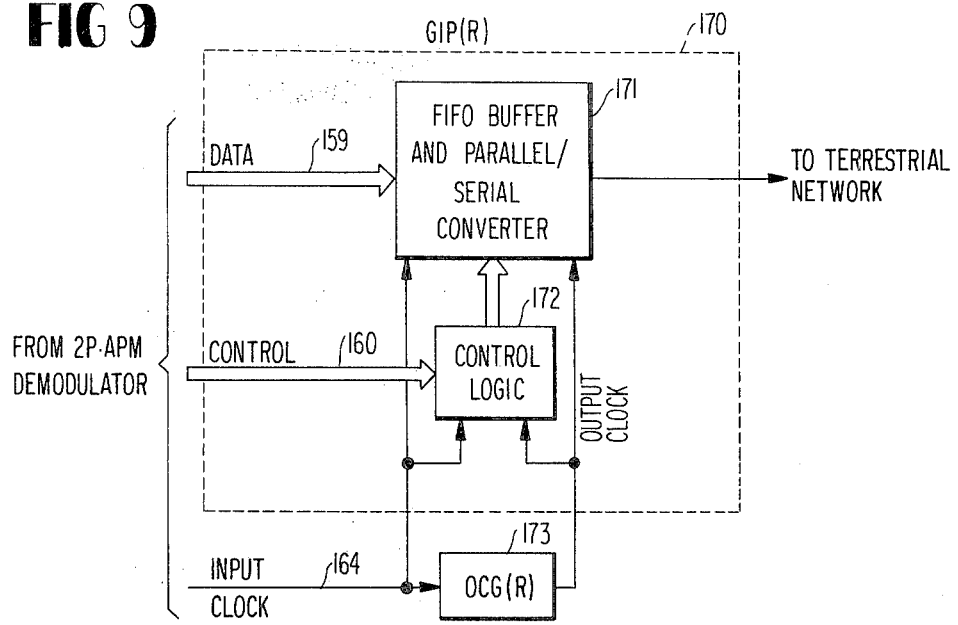
FIG. 9 is a block diagram of a group processor used with the demodulator.
Figure 10:
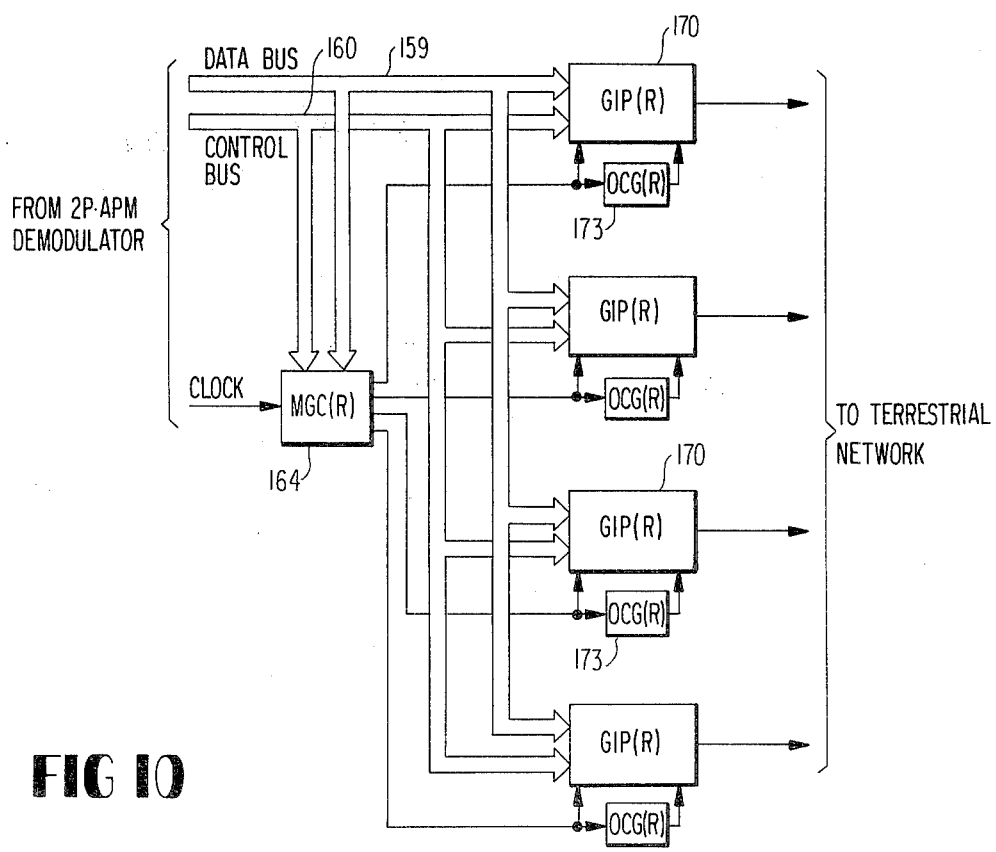
FIG. 10 is a block diagram of a multi-group processor used with the demodulator.

The output data bus 159 (which conveys both data and service word information) and control bus 160 from control processor 157 are coupled to one of the circuits shown in FIG. 9 or 10 along with the clock signal on line 164. For a single 30-line group, the configuration of FIG. 9 with a single group interface processor (receive) 170 is used while for multiple groups the configuration of FIG. 10 is employed.

Referring to FIG. 9, the data and service words are read into first in/first out buffer and parallel/serial converter 171 under direction of control logic 172 at the rate of the clock signal on line 164. The words are then subsequently read out in serial fashion with an output clock produced by output clock generator (receive) 173 which will be at the same rate at which the incoming information was received at the transmitting station from the input terrestrial network. The output data format and read-out rate are, of course, determined by the characterization and requirements of the receiving terrestrial network and should be adjusted accordingly.

Control logic 172 may be construction with the same type integrated circuit as control logic 107. Similarly, the structure of first in/first out buffer 171 is the same as that of first in/first out buffer 103 above. Control processor 157 is also the same as control logic 172 except that it includes a circuit for comparing the bit stream output from frame recovery circuit 156 with the received data to determine whether a 180° phase reversal has occurred. A Texas Instruments type SN 7486 exclusive-OR gate will perform this function. The output of this circuit labelled "PHASE AMBIGUITY KICK-OFF" is in the logical 1 state when the bit streams are inverted with respect to one another. This signal then causes VCO 161 to invert the phase to its output signal thereby inverting the logical state of the received data. The PHASE AMBIGUITY KICKOFF signal then goes to the logical 1 state. Control processor 157 also includes a simple decoder circuit which produces a logical "1" output whenever a service word is detected as described above. A Texas Instruments, Inc. integrated circuit type SN 74153 may be employed to perform this function.

For multiple line groups, multiple group interface processors (receive) 170 may be interconnected as shown in FIG. 10. Here, a multigroup clock generator (receive) is provided for distributing the clock signal on line 164 to each of output clock generators (receive) 173. Again, the output data format and output rate should be determined according to the requirements of the receiving terrestrial network.

This completes the description of the preferred embodiments of the invention. Although preferred embodiments have been described, it is believed that numerous modifications and alterations thereto would be apparent to one of ordinary skill in the art without departing from the spirit and scope of the invention.

What is claimed is:

1. In combination:
   means for modulating a carrier signal during first time intervals with a first modulation type, said carrier signal being continuously produced during said first time intervals; and
   means for modulating said carrier signal during second time intervals with a second modulation type, said first and second time intervals alternating consecutively with each other, said carrier signal being substantially extinguished during said second time intervals when the corresponding signal with which said carrier is modulated is of substantially zero amplitude.

2. The combination of claim 1 wherein said first modulation type is phase shift keying modulation.

3. The combination of claim 1 wherein said second modulation type is amplitude and phase modulation.

4. The combination of claim 3 wherein said signal with which said carrier is modulated with said second modulation type comprises digitized samples of an analog signal.

5. The combination of claim 4 wherein said analog signal comprises an audio frequency signal.

6. The combination of any of claims 1–5 further comprising means for transmitting the modulated carrier signal within a predetermined frequency band.

7. Apparatus for modulating a carrier signal in accordance with digital words in which some of the words are service words and others of the words are data words, comprising in combination:

means for determining whether an input digital word is a service word or a data word; and means for producing a modulated carrier signal in response to said determining means, said modulated signal being of a constant amplitude for service words and of an amplitude dependent upon the numeric value of the word for data words.

8. The apparatus of claim 7 wherein said data words represent digital samples of an analog signal.

9. The apparatus of claim 8 wherein said amplitude of said carrier signal is substantially zero when the amplitude of said analog signal is substantially zero.

10. The apparatus of claim 9 wherein said carrier signal is modulated with phase shift keying modulation for said service words.

11. The apparatus of claim 10 wherein said carrier signal is modulated with amplitude and phase modulation for said data words.

12. The apparatus of any of claims 7–11 further comprising means for transmitting said modulated carrier signal within a predetermined frequency band.

13. A modulator for producing a modulated carrier signal in response to an input stream of digital words, some of which are service words and some of which are data words, comprising in combination:

means for producing a digital control signal for indicating whether a digital word is a service word or a data word;

a memory, said memory being addressed by words of said input stream of digital words; said memory storing first and second digital numbers for each input address, said first and second digital numbers together being representative of amplitude and phase properties for each value of digital words;

first and second digital-to-analog converters, the data inputs of each of said digital-to-analog converters being coupled to said memory, said first digital-to-analog converter being coupled to receive said first digital numbers and said second digital-to-analog converter being coupled to receive said second digital numbers;

first and second filter means, said first filter means being coupled to the output of said first digital-to-analog converter and said second filter means being coupled to the output of said second digital-to-analog converter;

first and second analog signal multipliers, said first analog signal multiplier having one input coupled to the output of said first filter means and said second analog signal multiplier having one input coupled to the output of said second filter means;

a carrier signal source, said source having two outputs in phase quadrature with one another, one of said outputs being coupled to a second input of said first analog signal multiplier and the other one of said outputs being coupled to a second input of said second analog signal multiplier; and means for summing the outputs of said first and second analog signal multipliers to produce thereby said modulated carrier signal.

14. The modulator of claim 13 wherein said digital numbers stored in said memory represent a constant amplitude for each service word value.

15. The modulator of claim 14 further comprising means for multiplexing a plurality of streams of digital words to form a single stream.

16. The modulator of claim 14 wherein each data word is divided into two segments, the first of said segments comprising a first sequence of digits including the most significant digit of said data word and the second of said segments comprising a second sequence of digits including the least significant digit of said data word, each of said segments separately addressing said memory, and a separate set of digital numbers being produced by said memory for each of said segments.

17. The modulator of claim 16 wherein said first segment comprises fewer digits than said second segment.

18. The modulator of claim 17 wherein the number of digits in each digital number produced by said memory is the same.

19. A method for modulating a carrier signal in accordance with an input stream of digital words, some of which are service words and some of which are data words, comprising the steps of:

modulating said carrier signal with phase shift keying modulation in response to said service words; and modulating said carrier signal with amplitude and phase modulation in response to said data words.

20. The method of claim 19 wherein said data words correspond to samples of an analog signal.

21. The method of claim 19 wherein the amplitude of the modulated carrier signal is substantially zero for a data word corresponding to a sample of said analog signal of substantially zero amplitude.

22. The method of claim 21 wherein said step of modulating said carrier signal with amplitude and phase modulation comprises:

dividing said data words into a plurality of segments; and modulating said carrier signal separately in accordance with each of said segments.

23. Apparatus for demodulating a received signal which is modulated in accordance with digital service words and data words and which contains phase modulation components representing the service words and amplitude and phase modulation components representing the data words, comprising, in combination:

means for dividing the received signal into quadrature components;

means for producing digital samples of each of said quadrature components at predetermined intervals; and memory means, said memory means being addressed by said digital samples of said quadrature components and said memory means storing digital numbers representing digital decision outputs for service words and data words.

24. The apparatus of claim 23 wherein each of said data words comprises at least two segments, said memory storing separate digital numbers for each of said segments.

25. The apparatus of claim 24 wherein the first one of said segments comprises a first sequence of digits including the most significant digit and said second segment comprises a second sequence of digits including the least significant digit of the decision output for each word.

26. The apparatus of claim 25 wherein said second sequence comprises more digits than said first sequence.

27. The apparatus of claim 26 wherein at least one digit is common to both sequences.

28. The apparatus of claim 23 wherein said memory means further stores digital numbers representing errors in said digitized samples in magnitude and phase.

29. The apparatus of claim 28 further comprising means for correcting received signals in response to said digital numbers representing said errors.

30. The apparatus of claim 23 further comprising first and second filters coupled between said means for dividing the received signals into quadrature components and said digital sample producing means.

31. The apparatus of claim 30 wherein each of said first and second filters are Nyquist-matched for the received signals.

* * * * *